United States Patent

Avalos et al.

[11] Patent Number: 5,953,067
[45] Date of Patent: Sep. 14, 1999

[54] MULTICHANNEL TELEVISION SOUND STEREO AND SURROUND SOUND ENCODER

[75] Inventors: Sealtiel Avalos; Ken Kaylor, both of Dallas; Robert Kaylor, Rowlett; Robert Kessler, Dallas, all of Tex.

[73] Assignee: Cable Electronics, Inc., Garland, Tex.

[21] Appl. No.: 08/918,754

[22] Filed: Aug. 25, 1997

Related U.S. Application Data

[60] Provisional application No. 60/037,525, Feb. 10, 1997.

[51] Int. Cl.$^6$ .................................................. H04N 7/04
[52] U.S. Cl. ........................ 348/485; 348/484; 348/738; 381/106
[58] Field of Search .................................. 348/485, 484, 348/483, 482, 481, 480, 736, 738; 381/14, 18, 13, 22, 106; 333/14; H04N 7/04

[56] References Cited

U.S. PATENT DOCUMENTS

| | | | |
|---|---|---|---|
| 4,048,654 | 9/1977 | Wegner | 348/485 |
| 4,139,866 | 2/1979 | Wegner | 348/485 |
| 4,339,772 | 7/1982 | Eilers et al. | 348/485 |
| 4,405,944 | 9/1983 | Eilers et al. | 348/485 |
| 4,512,031 | 4/1985 | Van Gils | 348/485 |
| 4,661,851 | 4/1987 | Muterspaugh | 381/106 |
| 4,674,122 | 6/1987 | Orban | 381/106 |
| 4,704,727 | 11/1987 | Beard | 381/13 |
| 4,716,589 | 12/1987 | Matsui | 381/3 |
| 4,752,955 | 6/1988 | Torick | 381/13 |
| 4,771,464 | 9/1988 | Kadin et al. | 381/13 |
| 5,119,503 | 6/1992 | Mankovitz | 381/14 |
| 5,349,386 | 9/1994 | Borchardt et al. | 348/485 |
| 5,373,562 | 12/1994 | Albean | 381/13 |
| 5,377,272 | 12/1994 | Albean | 381/13 |
| 5,602,922 | 2/1997 | Lee | 381/18 |
| 5,610,985 | 3/1997 | Ten Kate | 381/27 |
| 5,619,577 | 4/1997 | Hasler | 381/14 |
| 5,631,968 | 5/1997 | Frey et al. | 381/106 |
| 5,796,842 | 8/1998 | Hanna | 348/738 |

OTHER PUBLICATIONS

National Association of Broadcasters, *8th Edition NAB Engineering Handbook*, Mar. 1992, pp. 553–568.

*Primary Examiner*—Michael H. Lee
*Assistant Examiner*—Jean W. Désir
*Attorney, Agent, or Firm*—Strasburger & Price, LLP; Matthew J. Booth

[57] ABSTRACT

The present invention provides an apparatus that transmits the stereo and the surround sound information of the L–R signal without excessive attenuation at the higher frequencies in order to allow transmission of surround sound through a noisy medium. The apparatus includes a surround sound conditioner coupled to receive a L–R signal portion of the television signal for pre-emphasizing and companding the L–R signal to produce a conditioned L–R signal; a mixer coupled to the surround sound conditioner for switching the conditioned L–R signal at a predetermined value to produce an amplitude modulated L–R signal; and a synchronizing circuitry coupled to the mixer for maintaining the predetermined value in step with the reference value, wherein the mixed L–R signal is combined with a L+R signal portion of the television signal to produce a composite output signal. Furthermore, a method of transmitting stereo and surround sound in accordance with multichannel television sound protocol includes the steps of preconditioning a L–R signal; synchronizing the preconditioned L–R signal to a reference value to produce a synchronized L–R signal; and mixing the synchronized L–R signal with a L+R signal to produce a composite output signal.

13 Claims, 2 Drawing Sheets

MULTICHANNEL TELEVISION SOUND STEREO AND SURROUND SOUND ENCODER

This application claims the benefit of U.S. Provisional Application No. 60/037,525, filed Feb. 10, 1997.

BACKGROUND OF THE INVENTION

This invention relates in general to signal processing, and, more specifically, to a method of transmitting surround sound through a noisy medium, such as a coaxial cable.

Currently available devices, commonly referred to as modulators, for transmitting sound according to Multichannel Television Sound (MTS) standard lack the ability to transmit surround sound information due to signal attenuation and noise. According to the MTS standard, the L–R signal, which represents the difference between left (L) and right (R) channel signals, contains the stereo information as well as the surround sound information. The surround sound information is carried at higher frequencies than the stereo information. The monaural signal, which is the L+R signal, is transmitted as a frequency modulated carrier, according to MTS standards. On the other hand, the L–R signal is transmitted as an amplitude modulated (AM) suppressed carrier at twice the horizontal scanning frequency of a television according to MTS standards. In order to receive and detect the L–R signal accurately, attenuation of an AM signal must be minimized. Most modulators currently available can accurately transmit information at the lower frequencies, but have excessive roll-off at the higher frequencies, which prevents transmission of surround sound information. The greater the roll-off at higher frequencies, measured in dBu, the greater the attenuation of the signal at the higher frequencies, and therefore, the greater the attenuation of the surround sound information. At some point in the frequency spectrum the roll-off is so great that the surround sound information can not be distinguished from the noise, which results in loss of the surround sound information. Consequently, only the stereo information is transmitted and detected while the surround sound information is lost. For example, some systems have a 15 dB roll-off at about 8 kHz, which means that more than half of the signal strength is lost due to attenuation, which results in loss of the surround sound information carried at the higher frequencies of the L–R signal.

Therefore, what is needed is an apparatus that transmits the stereo and the surround sound information of the L–R signal without excessive attenuation at the higher frequencies in order to allow transmission of surround sound through a noisy medium.

SUMMARY OF THE INVENTION

The present invention, accordingly, provides an apparatus that transmits the stereo and the surround sound information of the L–R signal without excessive attenuation at the higher frequencies in order to allow transmission of surround sound through a noisy medium. To this end, an apparatus for passing stereo and surround sound information contained in a television signal in accordance with the multichannel television sound standard through a noisy medium includes a surround sound conditioner coupled to receive a L–R signal portion of the television signal for pre-emphasizing and companding the L–R signal to produce a conditioned L–R signal; a mixer coupled to the surround sound conditioner for switching the conditioned L–R signal at a predetermined value to produce an amplitude modulated L–R signal; and a synchronizing circuitry coupled to the mixer for maintaining the predetermined value in step with the reference value, wherein the mixed L–R signal is combined with a L+R signal portion of the television signal to produce a composite output signal. Furthermore, a method of transmitting stereo and surround sound in accordance with multichannel television sound protocol includes the steps of preconditioning a L–R signal; synchronizing the preconditioned L–R signal to a reference value to produce a synchronized L–R signal; and mixing the synchronized L–R signal with a L+R signal to produce a composite output signal.

One advantage of the present invention is the ability to pass surround sound through a noisy medium.

Another advantage of the present invention is that there is over 30 dB separation of the channels.

Yet another advantage of the invention is the ability to have multiple channels that transfer the information in surround sound.

Yet another advantage is elimination of the need for several cables to transfer the information from one receiver to the next in surround sound.

DETAILED DESCRIPTION OF DRAWINGS

Figure 1:
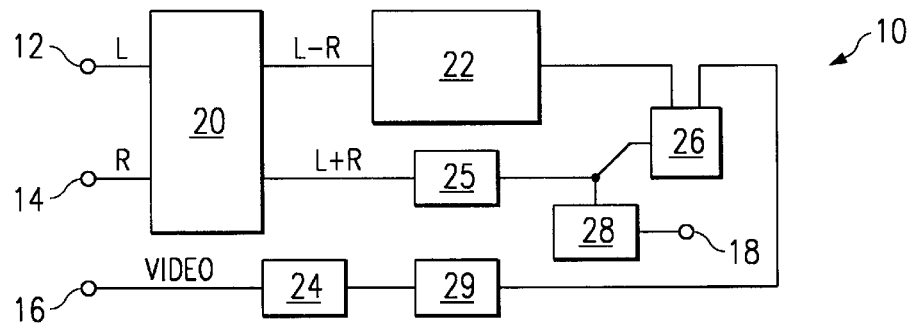
FIG. 1 is a schematic block diagram of an MTS stereo and surround sound encoder embodying features of the present invention.

FIG. 1 is a schematic block diagram of a Multichannel Television Sound (MTS) stereo and surround sound encoder, generally designated by a reference numeral 10, having a left audio input 12, a right audio input 14, a video input 16, an output 18, an audio breakout matrix (ABM) 20, a surround sound conditioner (SSC) 22, a video stripper matrix (VSM) 24, a L+R low pass clamping filter 25, a mixer 26, an amplifier circuit 28, and a timing circuit 29. The encoder 10 utilizes two pilot signal frequencies. Output of the VSM 24 is coupled to the timing circuit 29 to produce the two pilot signal frequencies as discussed below. One pilot signal is at 15.734 kHz, which is a television's horizontal rate, for synchronizing the encoder 10. The second pilot signal is at 31.468 kHz, which is two times the horizontal rate of the television, for synchronizing transfer of a L–R signal information.

Figure 2:
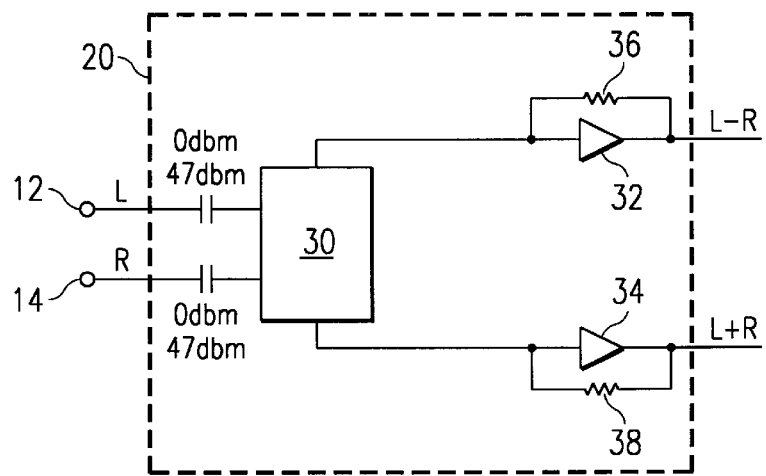
FIG. 2 is a schematic block diagram of a first section of the encoder of FIG. 1 shown in greater detail.

In FIG. 2, the ABM 20 is shown in greater detail. The ABM 20 receives a left input signal and a right input signal at the left audio input 12 and the right audio input 14, respectively. The input signals are matrixed by a resistor network 30. The resistor network 30 has a plurality of resistors, each resistors has a value of approximately 100 KΩ, generates stereo information and surround sound information, collectively referred to as the L–R signal, and monaural information, referred to as the L+R signal. Use of large resistors in the resistor network 30 causes attenuation in the signals. Therefore, audio amplifiers for the L–R and the L+R signals, designated 32 and 34 respectively, return the levels of the signals to normal. Resistors 36 and 38 are selected in conjunction with the amplifiers 32 and 34, respectively, to produce the desired amplification of the signals. The L+R signal is transmitted through the L+R low pass clamping filter 25 and the amplifier circuit 28 to the output 18. The L+R low pass clamping filter 25 is a low pass filter (LPF) that will clamp the signal at 15.734 kHz and at 31.468 kHz to prevent interference with the pilot signals operating at 15.734 kHz and 31.468 kHz. The L–R signal output of the ABM 20 is transmitted to the SSC 22.

Figure 3:
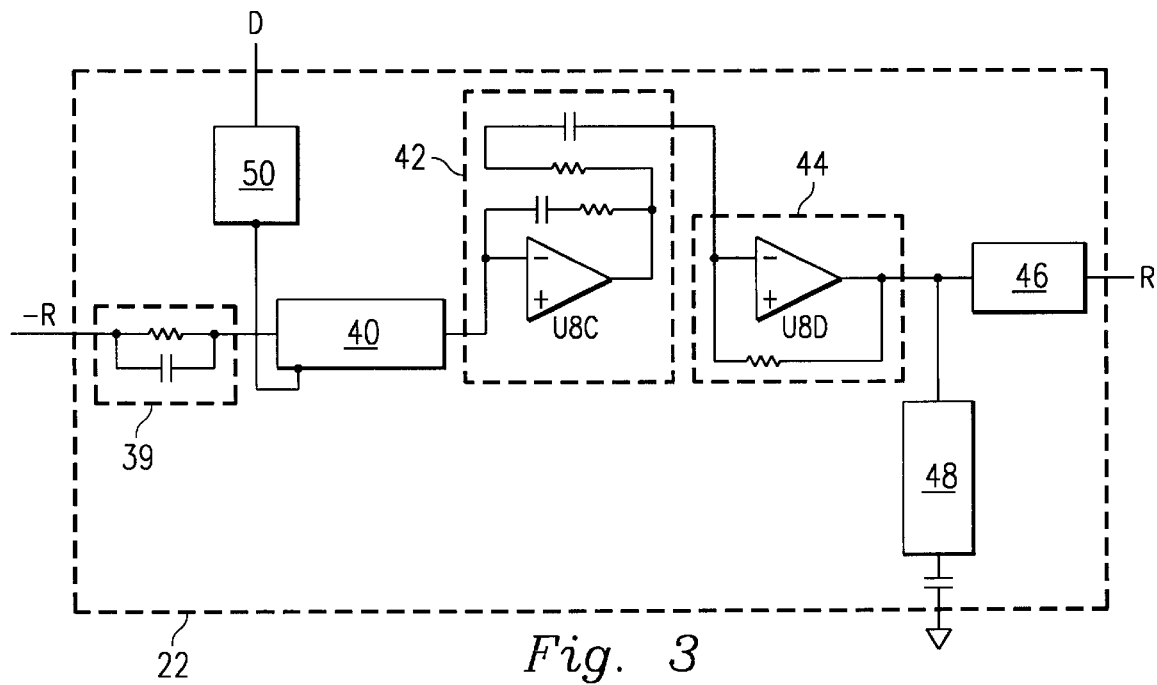
FIG. 3 is a schematic block diagram of a second section of the encoder of FIG. 1 shown in greater detail.

As shown in FIG. 3, the SSC 22 includes a pre-emphasizer 39, a Dolby noise reduction (dbx) compander 40, a low pass (LP) filter network 42, a regeneration amplifier 44, an L–R clamping filter 46, and a diode circuit 48. The L–R signal is received at the SSC 22. The pre-emphasizer 39 operates at 396 μsec. The pre-emphasizer 39 is used to condition the L–R signal for the dbx compander 40. In operation, the pre-emphasizer 39 gives higher frequencies of the L–R signal the same power as lower frequency of the L–R signal. The higher frequencies need a boost in power because the lower frequencies travel much easier due to Doppler effects. Thus, the surround sound information contained at the higher frequencies of the L–R signal now has more power. The pre-emphasized signal is then sent to the dbx compander 40. The dbx compander 40 amplitude compresses the L–R signal according to the MTS standard. Amplitude compression is used to reduce the signal-to-noise (SN/R) ratio. Amplitude compression is performed by routing the output of the L–R clamping filter 46 through a transistor buffer stage 54 (FIG. 4) through a constant current circuit 50 and to the dbx compander 40. The constant current circuit 50 is a root-mean-square (RMS) stage of the dbx compander 40, which controls the amplitude of the L–R signal.

The output L–R signal of the compander 40 is passed through the LP filter network 42. The LP filter network 42 filters out any unwanted noise to produce a filtered L–R signal. The LP filter network 42 attenuates the original L–R signal during the filter process so that the filtered L–R signal will be slightly attenuated. Therefore, the filtered L–R signal is passed through the amplifier 44. The amplifier 44 returns the filtered L–R signal back to the proper signal level.

At this point, the filtered L–R signal must be clamped off at 15.734 kHz and 31.468 kHz frequencies to prevent interference with the pilot signals. The L–R clamping filter 46 is used to clamp the signals at 15.734 kHz and 31.468 kHz frequencies. The L–R clamping filter 46 will trap the signal to create about 45 dB roll-off at 15.734 kHz and 31.468 kHz frequencies. The L–R clamping filter 46 effectively traps the L–R signal, at 15.734 kHz, to ground and prevents the 15.734 kHz pilot signal from taking hits. Likewise, the L–R clamping filter 46 traps any switching signal contained in the L–R signal at 31.468 kHz to ground to provide clean stereo/surround sound output. Thus, the information signal will be reduced to minimal levels and will not interfere with or allow the pilot signal to take hits. In addition to clamping the filtered L–R signal at the 15.734 kHz and 31.468 kHz frequencies, voltage spikes in the filtered L–R signal must be eliminated. The diode circuit 48 eliminates voltage spikes by leveling off voltage spikes so the peak-to-peak (P-P) voltage does not exceed 1.4 volts. The diode circuit 48 will take the filtered L–R signal and produce a leveled L–R signal. The leveled L–R signal will have the frequencies clamped off at the two frequencies 15.734 kHz and 31.468 kHz.

Figure 4:
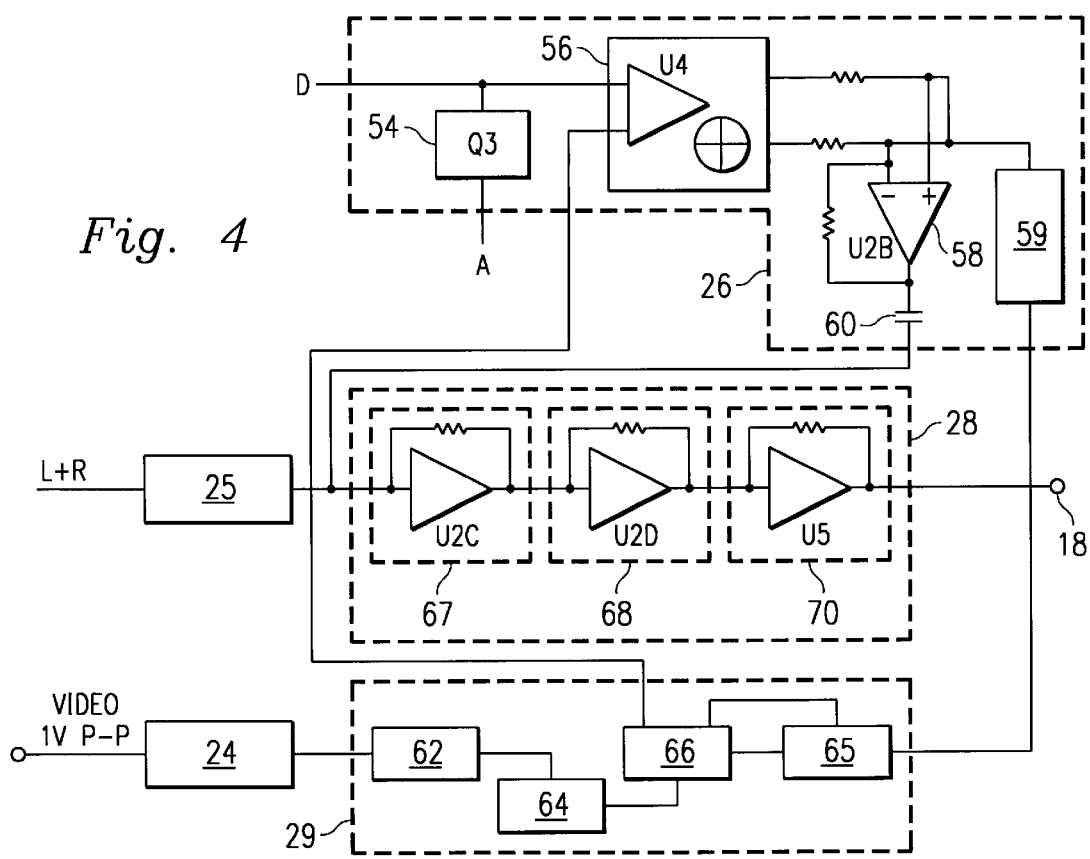
FIG. 4 is a schematic block diagram of a third section of the encoder of FIG. 1 shown in greater detail.

FIG. 4 shows the VSM 24, the L+R low pass clamping filter 25, the mixer 26, the amplifier circuit 28, the timing circuit 29, and the transistor buffer stage 54. As discussed above, the output of the L–R clamping filter 46 is sent to the transistor buffer stage 54. The output of the transistor buffer stage 54 is inputted to a balance modulator 56. The balance modulator 56 modulates the leveled L–R signal to produce an upper side band and a lower side band, around the pilot signal at the 31.468 kHz switching rate, as a reduced carrier amplitude modulated (AM) L–R signal. The switching rate of 31.468 kHz for the balance modulator 56 is produced by the timing circuit 29 as discussed below. A combining amplifier 58 blends the AM L–R signal output of the balance modulator 56 with the pilot signal at 15.734 kHz to produce a mixed L–R signal. Timing for the pilot signal at 15.734 kHz is produced by the modulator timing circuit 59. The modulator timing circuit 59 is synchronized to the 15.734 kHz rate of the television, which is produced by a synchronizing circuitry.

The synchronization circuitry synchronizes the switching rate at 31.768 kHz with the pilot signal at 15.734 kHz. The synchronization circuitry is made up of the VSM 24 and the timing circuit 29. The VSM 24 removes color or chroma information from a video signal to produce a luminous video pattern signal. The luminous video pattern signal is used to keep the encoder 10 (FIG. 1) in sync with the 15.734 kHz horizontal rate of the television. The luminous video pattern signal is sent to a synchronous separator 62. The synchronous separator 62 looks only at the 15.734 kHz horizontal rate to produces a clean horizontal sync signal. The sync signal is sent to a JK flip-flop 64. The JK flip-flop 64 produces a "saw" like signal pattern which drives a phase lock loop (PLL) 66 at a switching rate of 31.468 kHz. The PLL 66 in turn provides the 31.468 kHz switching rate to the balance modulator 56. Also, a JK flip-flop 65 provides the 15.734 kHz timing for the modulator timing circuit 59. Thus, the timing circuit 29 produces the sync signal that keeps the pilot signal at 15.734 kHz in sync with the pilot signal at 31.468 kHz switching rate. Accordingly, the balance modulator 56 is switched at 31.468 kHz in step with the pilot signal at 15.734 kHz to produce the AM L–R signal in step with the horizontal rate of the television.

The mixed L–R signal output of the combining amplifier 58 is sent through a capacitor 60 to the amplifier circuit 28. A output amplifier 67 receives the mixed L–R signal and the L+R signal. The output amplifier 67 amplifies the mixed L–R signal and the L+R signal to produce a amplified output signal. The amplified output signal is sent to a variable gain amplifier 68 to produce a composite output signal. The composite output signal is sent through a buffer stage 70, which reduces loading, to the output 18.

Figure 5:
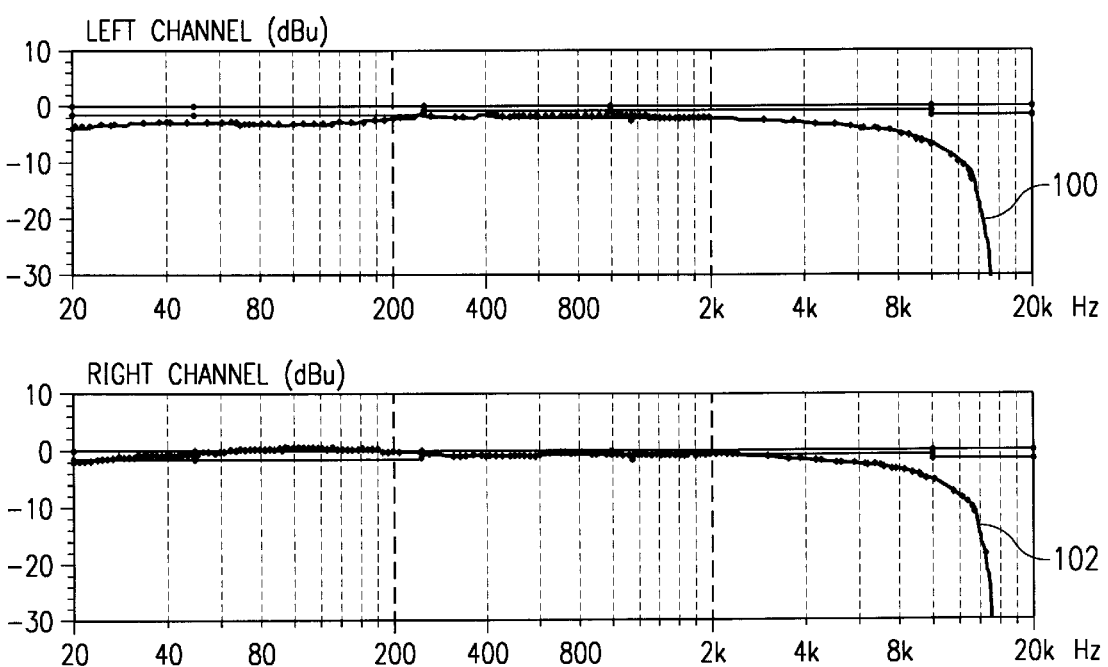
FIG. 5 is a graph illustrating the signal-to-noise ratio of the encoder of FIG. 1.

In operation, and as shown in FIG. 5, the encoder 10 prevents excessive attenuation or roll-off at the higher frequencies. The vertical scale of the graph represents the signal attenuation in dBu and the horizontal scale represents the frequency in Hz. A curve 100 represents an output signal strength of a left channel over a range of frequencies. The attenuation is about 3 dBu at about 12 kHz. Likewise, a curve 102 represents an output signal strength of a right channel over a range of frequencies. As indicated, the attenuation is about 3 dBu at about 12 kHz.

Also, both the curves 100 and 102 have the desired flat characteristic, at zero dBu, throughout the range of frequencies. Additionally, the output signal strength drops off very rapidly to prevent interference with the pilot signal at 15.734 kHz.

Although illustrative embodiments have been shown and described, a wide range of modifications, changes and substitutions are contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. Apparatus for passing mono, stereo and surround sound information contained in a television signal in accordance with the multichannel television sound standard through a noisy medium, the apparatus comprising:

a surround sound conditioner coupled to receive a L–R signal portion of the television signal for pre-emphasizing and companding the L–R signal to produce a conditioned L–R signal, wherein the surround sound conditioner further comprises:

a pre-emphasizer coupled to receive the L–R signal for increasing energy levels of high frequencies contained in the L–R signal;

a compander coupled to an output of the pre-emphasizer for amplitude compression of the pre-emphasized L–R signal to reduce the signal-to-noise ratio;

a filter network coupled to an output of the compander for eliminating noise in the pre-emphasized L–R signal to produce a filtered L–R signal;

an amplifier coupled to an output of the filter network for amplifying the filtered L–R signal;

a clamping filter coupled to an output of the amplifier for trapping the filtered L–R signal at the reference value and the predetermined value; and a diode circuit coupled to the output of the amplifier for eliminating voltage spikes in the filtered L–R signal and reducing peak-to-peak voltage value of the filtered L–R signal to a predetermined peak-to-peak value;

a mixer coupled to the surround sound conditioner for switching the conditioned L–R signal at a predetermined value to produce an amplitude modulated L–R signal; and a synchronizing circuitry coupled to the mixer for maintaining the predetermined value in step with a reference value, wherein the mixed L–R signal is combined with a L+R signal portion of the television signal to produce a composite output signal.

2. Apparatus for passing mono, stereo and surround sound information contained in a television signal in accordance with the multichannel television sound standard through a noisy medium, the apparatus comprising:

a surround sound conditioner coupled to receive a L–R signal portion of the television signal for pre-emphasizing and companding the L–R signal to produce a conditioned L–R signal;

a mixer coupled to the surround sound conditioner for switching the conditioned L–R signal at a predetermined value to produce an amplitude modulated L–R signal, wherein the mixer comprises:
a balance modulator coupled to the synchronizing circuitry and the surround sound conditioner for switching the L–R signal at the predetermined value to produce the amplitude modulated L–R signal; and
a combining amplifier coupled to the balanced modulator and the synchronizing circuitry for combining the amplitude modulated L–R signal with a pilot signal at the reference values; and a synchronizing circuitry coupled to the mixer for maintaining the predetermined value in step with a reference value, wherein the mixed L–R signal is combined with a L+R signal portion of the television signal to produce a composite output signal.

3. Apparatus for passing mono, stereo and surround sound information contained in a television signal in accordance with the multichannel television sound standard through a noisy medium, the apparatus comprising:

a surround sound conditioner coupled to receive a L–R signal portion of the television signal for pre-emphasizing and companding the L–R signal to produce a conditioned L–R signal;

a mixer coupled to the surround sound conditioner for switching the conditioned L–R signal at a predetermined value to produce an amplitude modulated L–R signal, wherein the mixer comprises:
a balance modulator coupled to the synchronizing circuitry and the surround sound conditioner for switching the L–R signal at the predetermined value to produce the amplitude modulated L–R signal; and
a combining amplifier coupled to the balanced modulator and the synchronizing circuitry for combining the amplitude modulated L–R signal with a pilot signal at the reference value; and a synchronizing circuitry coupled to the mixer for maintaining the predetermined value in step with a reference value, wherein the mixed L–R signal is combined with a L+R signal portion of the television signal to produce a composite output signal, wherein the synchronizing circuitry further comprises:
a video stripper matrix for receiving and removing the chroma information from a video signal of the television signal, thereby producing a luminous video pattern signal; and
a timing circuit coupled to the balance modulator, the combining amplifier and an output of the video stripper matrix, the timing circuit receives the luminous video pattern signal to produce the predetermined value and the reference value.

4. Apparatus for passing mono, stereo and surround sound information contained in a television signal in accordance with the multichannel television sound standard through a noisy medium, the apparatus comprising:

a surround sound conditioner coupled to receive a L–R signal portion of the television signal for pre-emphasizing and companding the L–R signal to produce a conditioned L–R signal;

a mixer coupled to the surround sound conditioner for switching the conditioned L–R signal at a predetermined value to produce an amplitude modulated L–R signal, wherein the mixer comprises:
a balance modulator coupled to the synchronizing circuitry and the surround sound conditioner for switching the L–R signal at the predetermined value to produce the amplitude modulated L–R signal; and
a combining amplifier coupled to the balanced modulator and the synchronizing circuitry for combining the amplitude modulated L–R signal with a pilot signal at the reference value; and a synchronizing circuitry coupled to the mixer for maintaining the predetermined value in step with a reference value, wherein the mixed L–R signal is combined with a L+R signal portion of the television signal to produce a composite output signal, wherein the synchronizing circuitry further comprises:
a video stripper matrix for receiving and removing the chroma information from a video signal of the television signal, thereby producing a luminous video pattern signal; and a timing circuit coupled to the balance modulator, the combining amplifier and an output of the video stripper matrix, the timing circuit receives the luminous video pattern signal to produce the predetermined value and the reference value, wherein the timing circuit comprises:

a phase lock loop coupled to an output of the video stripper matrix for producing the predetermined value; and a JK flip-flop coupled to the phase lock loop to generate the reference value, wherein the phase lock loop synchronizes the predetermined value with the reference value.

5. Apparatus for passing mono, stereo and surround sound information contained in a television signal in accordance with the multichannel television sound standard through a noisy medium, the apparatus comprising:

a surround sound conditioner coupled to receive a L-R signal portion of the television signal for pre-emphasizing and companding the L-R signal to produce a conditioned L-R signal;

a mixer coupled to the surround sound conditioner for switching the conditioned L-R signal at a predetermined value to produce an amplitude modulated L-R signal:

a synchronizing circuitry coupled to the mixer for maintaining the predetermined value in step with a reference value, wherein the mixed L-R signal is combined with a L+R signal portion of the television signal to produce a composite output signal; and an audio breakout matrix for receiving a left audio input signal and a right audio input signal of the television signal to produce the L-R signal and the L+R signal, wherein the audio breakout matrix comprises:

a resistor network coupled to receive the left audio input signal and the right audio input signal for producing the L-R and the L+R signals;

a first amplifier connected to a first output of the resistor network for restoring the signal level of the L-R signal; and a second amplifier connected to a second output of the resistor network for restoring the signal level of the L+R signal.

6. Apparatus for passing mono, stereo and surround sound information contained in a television signal in accordance with the multichannel television sound standard through a noisy medium, the apparatus comprising:

a surround sound conditioner coupled to receive a L-R signal portion of the television signal for pre-emphasizing and companding the L-R signal to produce a conditioned L-R signal;

a mixer coupled to the surround sound conditioner for switching the conditioned L-R signal at a predetermined value to produce an amplitude modulated L-R signal;

a synchronizing circuitry coupled to the mixer for maintaining the predetermined value in step with a reference value, wherein the mixed L-R signal is combined with a L+R signal portion of the television signal to produce a composite output signal;

an audio breakout matrix for receiving a left audio input signal and a right audio input signal of the television signal to produce the L-R signal and the L+R signal, wherein the audio breakout matrix comprises:

a resistor network coupled to receive the left audio input signal and the right audio input signal for producing the L-R and the L+R signals;

a first amplifier connected to a first output of the resistor network for restoring the signal level of the L-R signal; and a second amplifier connected to a second output of the resistor network for restoring the signal level of the L+R signal; and a low pass clamping filter coupled to the second amplifier for trapping the L+R signal at the reference value and the predetermined value.

7. Apparatus for passing mono, stereo and surround sound information contained in a television signal in accordance with the multichannel television sound standard through a noisy medium, the apparatus comprising:

a surround sound conditioner coupled to receive a L-R signal portion of the television signal for pre-emphasizing and companding the L-R signal to produce a conditioned L-R signal;

a mixer coupled to the surround sound conditioner for switching the conditioned L-R signal at a predetermined value to produce an amplitude modulated L-R signal;

a synchronizing circuitry coupled to the mixer for maintaining the predetermined value in step with a reference value, wherein the mixed L-R signal is combined with a L+R signal portion of the television signal to produce a composite output signal;

an audio breakout matrix for receiving a left audio input signal and a right audio input signal of the television signal to produce the L-R signal and the L+R signal, wherein the audio breakout matrix comprises:

a resistor network coupled to receive the left audio input signal and the right audio input signal for producing the L-R and the L+R signals:

a first amplifier connected to a first output of the resistor network for restoring the signal level of the L-R signal; and a second amplifier connected to a second output of the resistor network for restoring the signal level of the L+R signal;

a low pass clamping filter coupled to the second amplifier for trapping the L+R signal at the reference value and the predetermined value; and an amplifier circuit coupled to the low pass clamping filter for combining the mixed L-R signal with the L+R signal.

8. Apparatus for passing mono, stereo and surround sound information contained in a television signal in accordance with the multichannel television sound standard through a noisy medium, the apparatus comprising:

a surround sound conditioner coupled to receive a L-R signal portion of the television signal for pre-emphasizing and companding the L-R signal to produce a conditioned L-R signal;

a mixer coupled to the surround sound conditioner for switching the conditioned L-R signal at a predetermined value to produce an amplitude modulated L-R signal;

a synchronizing circuitry coupled to the mixer for maintaining the predetermined value in step with a reference value, wherein the mixed L-R signal is combined with a L+R signal portion of the television signal to produce a composite output signal;

an audio breakout matrix for receiving a left audio input signal and a right audio input signal of the television signal to produce the L−R signal and the L+R signal, wherein the audio breakout matrix comprises:
  a resistor network coupled to receive the left audio input signal and the right audio input signal for producing the L−R and the L+R signals;
  a first amplifier connected to a first output of the resistor network for restoring the signal level of the L−R signal; and
  a second amplifier connected to a second output of the resistor network for restoring the signal level of the L+R signal;
a low pass clamping filter coupled to the second amplifier for trapping the L+R signal at the reference value and the predetermined value; and
an amplifier circuit coupled to the low pass clamping filter for combining the mixed L−R signal with the L+R signal, wherein the amplifier circuit comprises:
  an output amplifier coupled to an output of the low pass clamping filter and an output of the mixer for combining the mixed L−R signal and the L+R signal to produce the composite output signal;
  a variable gain amplifier coupled to an output of the output amplifier for adjusting the composite output signal; and
  a buffer coupled to an output of the variable gain amplifier to reduce loading.

9. A method of transmitting stereo and surround sound in accordance with multichannel television sound protocol, the method comprising the steps of:
  preconditioning a L−R signal;
  synchronizing the preconditioned L−R signal to a reference value to produce a synchronized L−R signal; and
  mixing the synchronized L−R signal with a L+R signal to produce a composite output signal;
  wherein the step of preconditioning comprises the steps of:
    pre-emphasizing the L−R signal to increase energy of high level frequencies of the L−R signal;
    companding the L−R signal through amplitude compression to reduce signal-to-noise ratio;
    filtering the companded L−R signal to reduce noise levels;
    amplifying the filtered L−R signal;
    clamping peak-to-peak voltage value of the filtered L−R signal to predetermined peak-to-peak value;
    trapping the filtered L−R signal at a first frequency corresponding to the reference value to prevent interference with a pilot signal at the reference value; and
    trapping the filtered L−R signal at a second frequency corresponding to a predetermined value to prevent interference with a switching pilot signal at the predetermined value.

10. A method of transmitting stereo and surround sound in accordance with multichannel television sound protocol, the method comprising the steps of:
  preconditioning a L−R signal:
  synchronizing the preconditioned L−R signal to a reference value to produce a synchronized L−R signal; and
  mixing the synchronized L−R signal with a L+R signal to produce a composite output signal;
  wherein the step of preconditioning comprises the steps of:
    pre-emphasizing the L−R signal to increase energy of high level frequencies of the L−R signal;
    companding the L−R signal through amplitude compression to reduce signal-to-noise ratio;
    filtering the companded L−R signal to reduce noise levels;
    amplifying the filtered L−R signal;
    clamping peak-to-peak voltage value of the filtered L−R signal to predetermined peak-to-peak value;
    trapping the filtered L−R signal at a first frequency corresponding to the reference value to prevent interference with a pilot signal at the reference value, wherein the reference value is 15.734 kHz; and
    trapping the filtered L−R signal at a second frequency corresponding to a predetermined value to prevent interference with a switching pilot signal at the predetermined value, wherein the predetermined value is two times the reference value.

11. Apparatus for passing stereo and surround sound information contained in a television signal in accordance with the multichannel television sound standard through a noisy medium, the apparatus comprising:
  means for preconditioning a L−R signal;
  means for synchronizing the preconditioned L−R signal to a reference value to produce a synchronized L−R signal; and
  means for mixing the synchronized L−R signal with a L+R signal to produce a composite output signal;
  wherein the means for preconditioning further comprises:
    means for pre-emphasizing the L−R signal to increase energy of high level frequencies of the L−R signal;
    means for companding the L−R signal through amplitude compression to reduce signal-to-noise ratio;
    means for filtering the companded L−R signal to reduce noise levels;
    means for amplifying the filtered L−R signal;
    means for clamping peak-to-peak voltage value of the filtered L−R signal to predetermined peak-to-peak value;
    means for trapping the filtered L−R signal at a first frequency corresponding to the reference value to prevent interference with a pilot signal at the reference value; and
    means for trapping the filtered L−R signal at a second frequency corresponding to a predetermined value to prevent interference with a switching pilot signal at the predetermined value.

12. Apparatus for passing stereo and surround sound information contained in a television signal in accordance with the multichannel television sound standard through a noisy medium the apparatus comprising:
  means for preconditioning a L−R signal;
  means for synchronizing the preconditioned L−R signal to a reference value to produce a synchronized L−R signal, wherein the reference value is 15.734 kHz; and
  means for mixing the synchronized L−R signal with a L+R signal to produce a composite output signal;
  wherein the means for preconditioning further comprises:
    means for pre-emphasizing the L−R signal to increase energy of high level frequencies of the L−R signal;
    means for companding the L−R signal through amplitude compression to reduce signal-to-noise ratio;
    means for filtering the companded L−R signal to reduce noise levels;
    means for amplifying the filtered L−R signal;,
    means for clamping peak-to-peak voltage value of the filtered L−R signal to predetermined peak-to-peak value:

means for trapping the filtered L−R signal at a first frequency corresponding to the reference value to prevent interference with a pilot signal at the reference value: and means for trapping the filtered L−R signal at a second frequency corresponding to a predetermined value to prevent interference with a switching pilot signal at the predetermined value.

13. Apparatus for passing stereo and surround sound information contained in a television signal in accordance with the multichannel television sound standard through a noisy medium, the apparatus comprising:

means for preconditioning a L−R signal;

means for synchronizing the preconditioned L−R signal to a reference value to produce a synchronized L−R signal; and means for mixing the synchronized L−R signal with a L+R signal to produce a composite output signal;

wherein the means for preconditioning further comprises:

means for pre-emphasizing the L−R signal to increase energy of high level frequencies of the L−R signal;

means for companding the L−R signal through amplitude compression to reduce signal-to-noise ratio;

means for filtering the companded L−R signal to reduce noise levels;

means for amplifying the filtered L−R signal;

means for clamping peak-to-peak voltage value of the filtered L−R signal to predetermined peak-to-peak value, wherein the predetermined value is two times the reference values;

means for trapping the filtered L−R signal at a first frequency corresponding to the reference value to prevent interference with a pilot signal at the reference value; and means for trapping the filtered L−R signal at a second frequency corresponding to a predetermined value to prevent interference with a switching pilot signal at the predetermined value.

* * * * *